United States Patent
Chen et al.

(10) Patent No.: US 8,402,856 B2
(45) Date of Patent: Mar. 26, 2013

(54) ENGINE TAPERED GEAR ASSEMBLY

(75) Inventors: Joseph Young-Long Chen, Ann Arbor, MI (US); Arvo J. Siismets, Troy, MI (US)

(73) Assignee: GM Global Technology Operations LLC

( * ) Notice: Subject to any disclaimer, the term of this patent is extended or adjusted under 35 U.S.C. 154(b) by 385 days.

(21) Appl. No.: 12/507,482

(22) Filed: Jul. 22, 2009

(65) Prior Publication Data

US 2011/0017002 A1 Jan. 27, 2011

(51) Int. Cl.
*F16H 55/18* (2006.01)

(52) U.S. Cl. .......................................................... 74/409

(58) Field of Classification Search ............... 74/409, 74/411, 413, 440; 409/149; 123/90.31
See application file for complete search history.

(56) References Cited

U.S. PATENT DOCUMENTS

| | | | | |
|---|---|---|---|---|
| 2,537,672 A | * | 1/1951 | James | 74/411 |
| 4,789,366 A | * | 12/1988 | Hale et al. | 440/75 |
| 5,066,211 A | * | 11/1991 | Wunder et al. | 425/122 |
| 5,327,859 A | * | 7/1994 | Pierik et al. | 123/90.17 |
| 5,875,752 A | * | 3/1999 | Zhao et al. | 123/192.1 |
| 6,763,792 B2 | * | 7/2004 | Okamoto | 123/90.31 |

FOREIGN PATENT DOCUMENTS

| | | | | |
|---|---|---|---|---|
| JP | 06257660 A | * | 9/1994 | |
| JP | 07332439 A | * | 12/1995 | |

* cited by examiner

*Primary Examiner* — Vicky Johnson

(74) *Attorney, Agent, or Firm* — Harness, Dickey & Pierce, P.L.C.

(57) ABSTRACT

An engine gear drive assembly may include first and second taper gears and a biasing member. The first taper gear may be rotationally and axially fixed to the first rotary engine component. The second taper gear may be rotationally fixed to the second rotary engine component and axially displaceable relative to the second rotary engine component. The biasing member may bias the second taper gear in a first axial direction into engagement with the first taper gear.

16 Claims, 2 Drawing Sheets

ENGINE TAPERED GEAR ASSEMBLY

FIELD

The present disclosure relates to internal combustion engines, and more specifically to engine gear assemblies.

BACKGROUND

This section provides background information related to the present disclosure which is not necessarily prior art.

Engine assemblies may include gear drive assemblies to transfer rotation between rotary engine components. The gear assemblies may include a first gear rotationally and axially fixed to a first rotary engine component and a second gear rotationally and axially fixed to a second rotary engine component and engaged with the first gear. Clearances between the first and second gears may produce gear rattle during engine operation. The clearances may result from assembly and machining tolerances. Gear rattle may occur due to the displacement of the first and second rotary engine components relative to one another during engine operation.

SUMMARY

An engine gear drive assembly may include first and second taper gears and a biasing member. The first taper gear may be rotationally and axially fixed to the first rotary engine component. The second taper gear may be rotationally fixed to the second rotary engine component and axially displaceable relative to the second rotary engine component. The biasing member may bias the second taper gear in a first axial direction into engagement with the first taper gear.

An engine assembly may include first and second rotary engine components, first and second taper gears, and a biasing member. The first taper gear may be rotationally and axially fixed to the first rotary engine component. The second taper gear may be rotationally fixed to the second rotary engine component and axially displaceable relative to the second rotary engine component. The biasing member may be engaged with the second rotary engine component and the second taper gear and may bias the second taper gear in a first axial direction into engagement with the first taper gear.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only and are not intended to limit the scope of the present disclosure in any way.

Corresponding reference numerals indicate corresponding parts throughout the several views of the drawings.

DETAILED DESCRIPTION

Examples of the present disclosure will now be described more fully with reference to the accompanying drawings. The following description is merely exemplary in nature and is not intended to limit the present disclosure, application, or uses.

Figure 1:
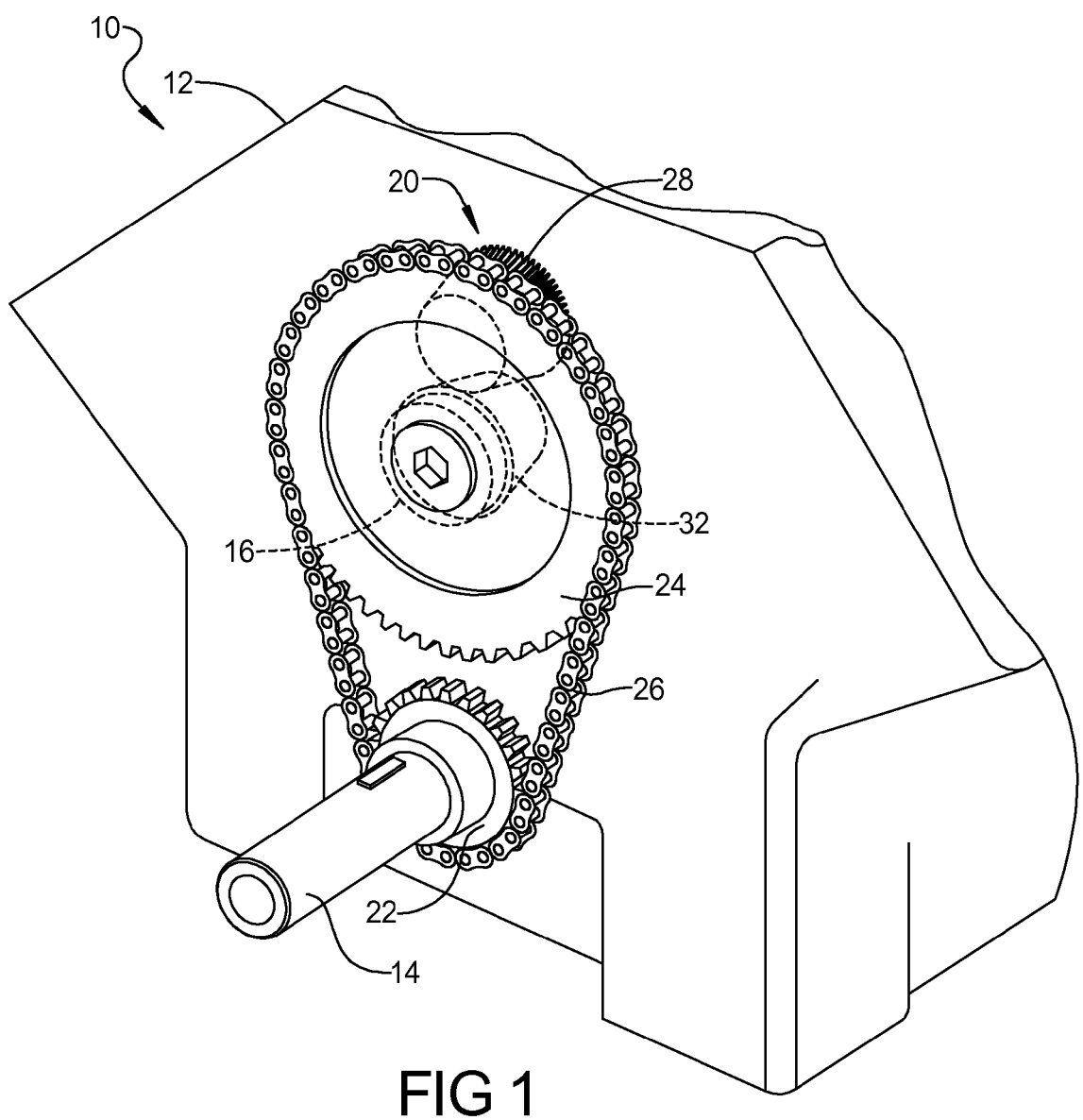
FIG. 1 is a fragmentary perspective illustration of an engine assembly according to the present disclosure.

Referring now to FIG. 1, an engine assembly 10 is schematically illustrated. The engine assembly 10 may include an engine structure 12 rotationally supporting first, second and third rotary engine components 14, 16, 18, and a gear drive assembly 20. By way of non-limiting example, the engine structure 12 may include an engine block or a cylinder head. The first rotary engine component 14 may include a crankshaft, the second engine component 16 may include a camshaft and the third rotary engine component 18 may include an additional rotationally driven component. By way of non-limiting example, the third rotary engine component 18 may include a balance shaft, a fuel pump drive shaft, or a camshaft. While illustrated in combination with a cam-in-block engine configuration, it is understood that the present disclosure applies equally to overhead cam configurations.

A first chain gear 22 may be fixed for rotation with the first rotary engine component 14 and a second chain gear 24 may be fixed for rotation with the second rotary engine component 16. The first chain gear 22 may be rotationally driven by the first rotary engine component 14. A drive chain 26 may be engaged with the first and second chain gears 22, 24 transfer rotation from the first chain gear 22 to the second chain gear 24 and drive the second rotary engine component 16.

The gear drive assembly 20 may include first and second taper gears 28, 32, a retaining member 40, a stop member 42, and a biasing member 44. The first taper gear 28 may be rotationally and axially fixed to the third rotary engine component 18. The first taper gear 28 may be rotatable with the third rotary engine component 18 about a first rotational axis (A1). The first taper gear 28 may include gear teeth 30 extending at a first angle (θ1) relative to the first rotational axis (A1).

The second taper gear 32 may be rotationally fixed to the second rotary engine component 16 and axially displaceable relative to the second rotary engine component 16. The second taper gear 32 may be rotatable with the second rotary engine component 16 about a second rotational axis (A2). The second taper gear 32 may include gear teeth 34, an inner bore 35 and an axial recess 37 within the inner bore 35. The gear teeth 34 of the second taper gear 32 may be engaged with the gear teeth 30 of the first taper gear 28 and may extend at a second angle (θ2) relative to the second rotational axis (A2).

The second rotary engine component 16 may be disposed within the bore 35 and may have the retaining member 40 axially and rotationally fixed thereto. The retaining member 40 may be located within the axial recess 37 to guide axial displacement of the second taper gear 32 along the second rotary engine component 16 and couple the second taper gear 32 for rotation with the second rotary engine component 16 to transfer torque therebetween. The retaining member 40 may include a ball that is fixed from axial travel along and rotation about the second rotary engine component 16. However, the ball may be rotatable in a fixed location to reduce friction between the second taper gear 32 and the second rotary engine component 16 during axial displacement of the second taper gear 32.

The second taper gear 32 may define first and second ends 36, 38. The first end 36 may define a first diameter greater than a second diameter defined by the second end 38. The gear teeth 34 of the second taper gear 32 may extend in a radially outward direction from the second end 38 to the first end 36. More specifically, the gear teeth 34 may extend along an axial extent of the second taper gear 32 at the second angle (θ2) radially outward from the second rotational axis (A2) in a first axial direction (D1). The gear teeth 30 of the first taper gear 28 may extend along an axial extent of the first taper gear 28 at the first angle (θ1) radially outward from the first rotational axis (A1) in a second axial direction (D2) opposite the first axial direction (D1).

The stop member 42 may be axially fixed to the second rotary engine component 16 adjacent to the first end 36 of the second taper gear 32. A biasing member 44 may be located axially between the first end 36 of the second taper gear 32 and the stop member 42 and may bias the second taper gear 32 in the second axial direction (A2) into engagement with the first taper gear 28, providing engagement between the teeth 30 of the first taper gear 28 and the teeth 34 of the second taper gear 32. The engagement provided by the biasing member 44 may limit a gear rattle condition between the first and second taper gears 28, 32. By way of non-limiting example, the biasing member 44 may include a wave spring or a Belleville spring.

The first and second angles (θ1, θ2) may be approximately equal to avoid a locking condition between the first and second taper gears 28, 32. The difference (Δθ) between the first and second angles (θ1, θ2) may be may be less than or equal to four degrees. As discussed above, the second taper gear 32 may be axially displaceable along the second rotary engine component 16. By way of non-limiting example, the stop member 42 and biasing member 44 may provide for at least one millimeter (mm) of axial displacement for the second taper gear 32.

Figure 2:
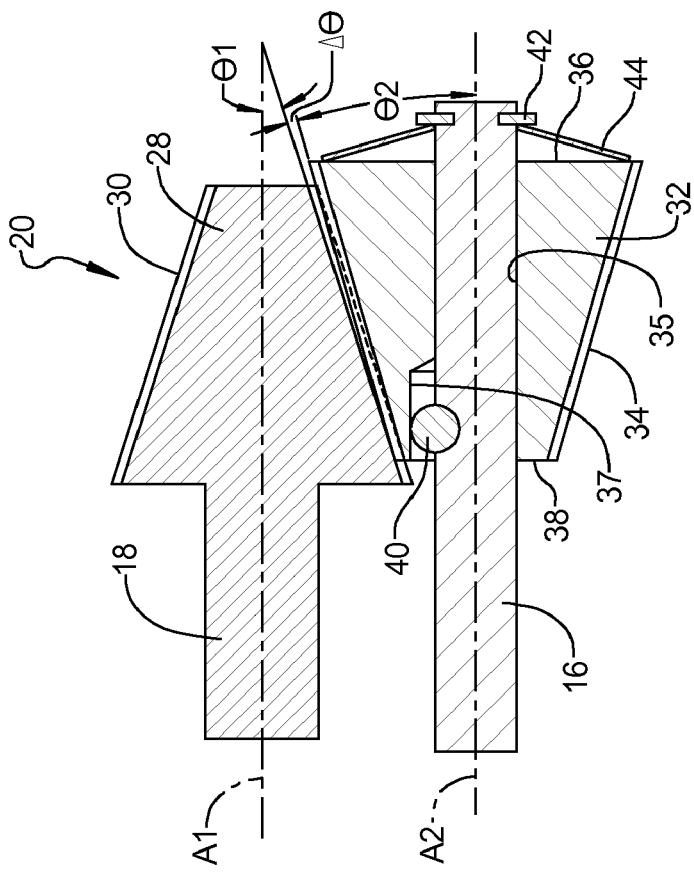
FIG. 2 is a schematic illustration of the gear assembly shown in the engine assembly of FIG. 1.
Figure 3:
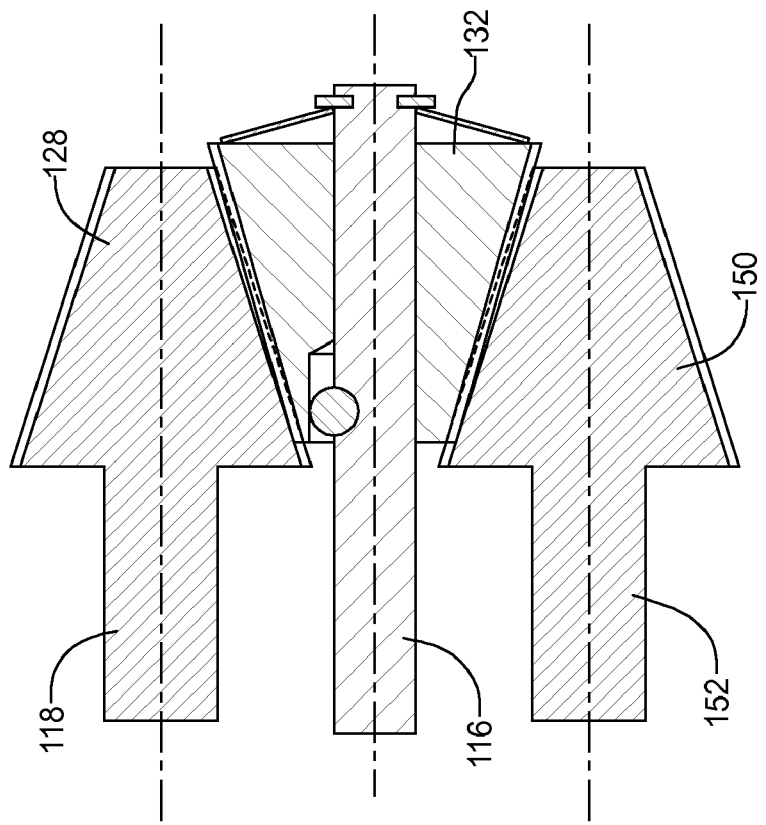
FIG. 3 is a schematic illustration of an alternate gear assembly according to the present disclosure.

With reference to FIG. 3, an alternate configuration is shown including a third taper gear 150. The arrangement of FIG. 3 may be generally similar to the arrangement of FIG. 2, with the exception of the third taper gear 150. Therefore, it is understood that the description of FIG. 2 applies equally to FIG. 3, with the exceptions indicated below. The first and third taper gears 128, 150 may be located on opposite radial sides of the second taper gear 132. The second taper gear 132 may be biased into both the first and third taper gears 128, 150 in the manner discussed above regarding FIG. 2. In the arrangement of FIG. 3, the third taper gear 150 may be rotationally and axially fixed to a fourth rotary engine component 152. By way of non-limiting example, the third and fourth rotary engine components 116, 152 may each include balance shafts.

What is claimed is:

1. An engine gear drive assembly comprising:
   a first taper gear rotationally and axially fixed to a first rotary engine component;
   a second taper gear rotationally fixed to a second rotary engine component and axially displaceable relative to the second rotary engine component, the second taper gear defining a bore receiving the second rotary engine component therein, the bore including an axial recess receiving a retaining ball fixed from axial travel along and rotation about the second rotary engine component to guide axial displacement of the second taper gear along the second rotary engine component and fix the second taper gear for rotation with the second rotary engine component, the retaining ball being rotatable in a fixed location relative to the second rotary engine component during axial displacement of the second taper gear; and
   a biasing member biasing the second taper gear in a first axial direction into engagement with the first taper gear and toward an engine structure supporting the first and second rotary engine components.

2. The gear drive assembly of claim 1, wherein the first taper gear includes gear teeth extending at a first angle radially outward from a first rotational axis thereof in a second axial direction opposite the first axial direction, the second taper gear including gear teeth engaged with the gear teeth of the first taper gear and extending at a second angle radially outward from a second rotational axis thereof in the first axial direction.

3. The gear drive assembly of claim 2, wherein the first and second angles are approximately equal.

4. The gear drive assembly of claim 3, wherein the difference between the first angle and the second angle is less than or equal to 4 degrees.

5. The gear drive assembly of claim 2, wherein the second taper gear includes first and second axial ends, the first axial end defining a greater diameter than the second axial end and being engaged with the biasing member.

6. The gear drive assembly of claim 1, further comprising a third taper gear rotationally and axially fixed to a third rotary engine component, the biasing member biasing the second taper gear in the first axial direction into engagement with the third taper gear.

7. An engine assembly comprising:
   an engine structure;
   a first rotary engine component supported on the engine structure;
   a first taper gear rotationally and axially fixed to the first rotary engine component;
   a second rotary engine component supported on the engine structure;
   a retaining ball located on the second rotary engine component and fixed from axial travel along and rotation about the second rotary engine component;
   a second taper gear rotationally fixed to the second rotary engine component and axially displaceable relative to the second rotary engine component, the second taper gear defining a bore receiving the second rotary engine component therein, the bore including an axial recess receiving the retaining ball, the retaining ball guiding axial displacement of the second taper gear along the second rotary engine component, fixing the second taper gear for rotation with the second rotary engine component, and being rotatable in a fixed location relative to the second rotary engine component during axial displacement of the second taper gear; and
   a biasing member engaged with the second rotary engine component and the second taper gear and biasing the second taper gear in a first axial direction toward the engine structure and into engagement with the first taper gear.

8. The engine assembly of claim 7, wherein the first taper gear includes gear teeth extending at a first angle radially outward from a first rotational axis thereof in a second axial direction opposite the first axial direction, the second taper gear including gear teeth engaged with the gear teeth of the first taper gear and extending at a second angle radially outward from a second rotational axis thereof in the first axial direction.

9. The engine assembly of claim 8, wherein the first and second angles are approximately equal.

10. The engine assembly of claim 9, wherein the difference between the first angle and the second angle is less than or equal to 4 degrees.

11. The engine assembly of claim 8, wherein the second taper gear includes first and second axial ends, the first axial end defining a greater diameter than the second axial end and being engaged with the biasing member.

12. The engine assembly of claim 7, further comprising a third rotary engine component and a third taper gear rotationally and axially fixed to the third rotary engine component, the biasing member biasing the second taper gear in the first axial direction into engagement with the third taper gear.

13. The engine assembly of claim 7, wherein the second taper gear drives rotation of the first taper gear.

14. The engine assembly of claim 13, wherein the second rotary engine component includes a camshaft.

15. The engine assembly of claim 14, wherein the first rotary engine component includes a balance shaft.

16. The engine assembly of claim 14, wherein the first rotary engine component includes a fuel pump drive shaft.

* * * * *